June 11, 1929.　　　J. W. VARDEN　　　1,716,992
LUBRICANT SEAL FOR SHAFT BEARINGS
Filed Nov. 19, 1926
Fig. 1.
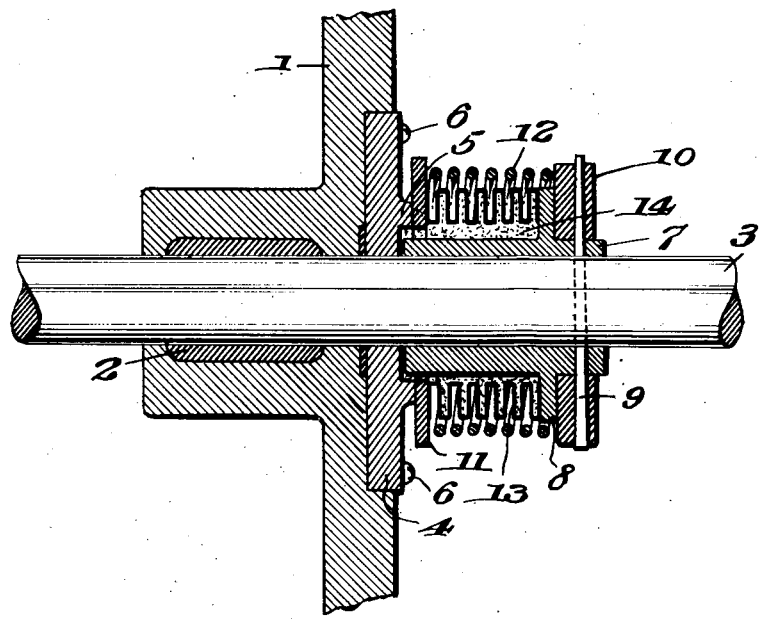
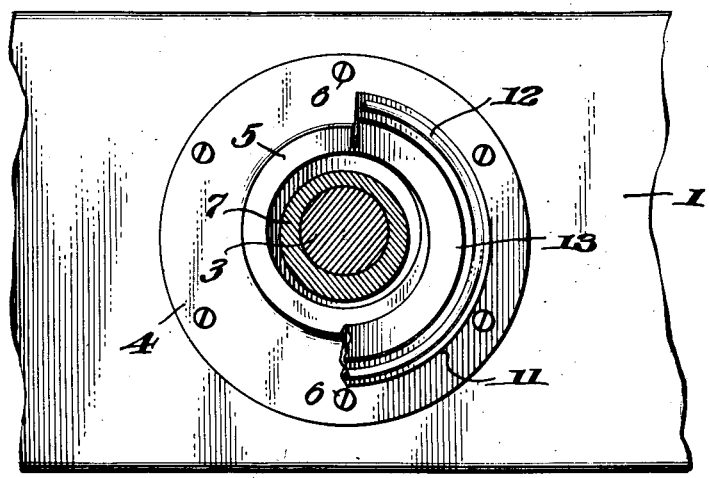
Fig. 2.
Inventor,
Joseph William Varden
By　　　　　　　Atty.

Patented June 11, 1929.

1,716,992

UNITED STATES PATENT OFFICE.

JOSEPH WILLIAM VARDEN, OF EVANSVILLE, INDIANA.

LUBRICANT SEAL FOR SHAFT BEARINGS.

Application filed November 19, 1926. Serial No. 149,356.

This invention relates to an improved self-adjusting seal for preventing grease, oil, air, gas, or other fluid from escaping from around a rotating shaft or out of a shaft bearing.

The invention is designed, not only to prevent the loss of lubricant from a shaft bearing but, also to automatically seal any bearing having a rotating shaft as, for instance, such as may be used on any machine where it is desirable to prevent the escape of valuable or dangerous gases, as, for example, in refrigerating machines.

My invention comprehends the provision of improved sealing means automatically tightened or adjusted by the rotation of the shaft in connection with which it is used.

A practical embodiment of the invention which effects this object comprises a seal which is kept tight or is rendered self-adjusting by an eccentric motion brought about by the action of the shaft in connection with the seal, such as is hereinafter described and set forth in the accompanying drawings in which:

Figure 1, is a longitudinal section; and

Figure 2, is a partly broken away cross-section.

The frame of the machine appears at 1 and is provided with a bearing 2 for the shaft 3.

Preferably, the seal, now to be described, is located on the exterior of the frame 1 of the machine so that it may be observed and be accessible.

Suitably secured to the frame 1 or bearing 2 is a plate 4 which has a raised circular ridge 5 arranged concentrically to the shaft 3. This ridge 5 constitutes a seat forming part of a ground or polished joint which is automatically kept tight to prevent escape of the lubricant or the oil, water, gas or other fluid by means which will now be described.

The plate 4 is secured to the frame 1 or bearing 2 by screws or bolts 6, or it may be otherwise connected.

Surrounding the shaft 3 is a thimble or collar 7 which has an integral flange 8.

The cross-sectional shape of this thimble or collar 7 in respect to the shaft is eccentric. The thimble 7 is secured to the shaft 3 in any suitable manner so that it will rotate with said shaft. As shown, the thimble 7 is fastened to the shaft by a pin or key 9 which passes through a collar 10 surrounding the thimble 7 and through a hole in shaft 3. This construction enables the thimble to be removed when desired but it also fastens it to the shaft so that it rotates with the latter.

Surrounding the thimble adjacent the seat 5 and bearing on said seat is a bearing plate 11 which has a ground or polished surface where it bears against said seat 5.

The bearing plate 11 is held in permanent contact with the seat 5 by a coil spring 12 of suitable strength which surrounds the thimble 7 and bears against collar 10 and the plate 11.

Contained within the coil spring 12 and interposed between the flange 8 and the plate 11 and welded or suitably connected to said flange 8 in a leak-proof manner, is an expansible and contractible lubricant container 13. The lubricant container 13 is of corrugated or bellows-like construction, made of sheet metal and adapted to expand and contract. This container 13 may be of the same general form and construction as the expansible and contractible hollow bellows-like diaphragms commonly used on steam boilers for the regulation of the dampers thereof. The advantage of this construction is that it will yield in an end-wise direction and, being soldered, brazed, or otherwise permanently connected to the flange 8 and the plate 11, the lubricant or the gas, or other fluid shown at 14 which has worked out from around the shaft 3, will be caught and held.

The principal feature of my invention is the automatic self-adjusting and self-maintained seal which is due to the eccentric mounting of the thimble 7 and the bearing plate 11. As the shaft 3 rotates, instead of the bearing plate 11 merely turning in a concentric manner in relation to said shaft and to the seat 5, the action resulting causes this plate 11 to shift as an entirety, or bodily in relation to seat 5 and a sealing effect is obtained which cannot be had where there is nothing but a sealing action due to pressure and contact.

What I claim is:

The combination with a shaft, of a thimble eccentrically mounted thereon to revolve therewith, a bearing seat which is stationary in relation to the shaft, a bearing plate which is carried by the thimble and contacts with said seat, an expansible and contractible container surrounding said thimble and connected thereto and to the bearing plate, and an expansible coil spring surrounding said container and bearing on said plate to hold said plate against said seat.

In testimony whereof I affix my signature.

JOSEPH WILLIAM VARDEN.